US007451236B2

United States Patent
Savitzky et al.

(10) Patent No.: US 7,451,236 B2
(45) Date of Patent: Nov. 11, 2008

(54) DOCUMENT DISTRIBUTION AND STORAGE SYSTEM

(75) Inventors: Stephen Savitzky, San Jose, CA (US); Gregory Wolff, Redwood City, CA (US); Bradley Rhodes, Palo Alto, CA (US)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 10/085,569

(22) Filed: Feb. 26, 2002

(65) Prior Publication Data

US 2003/0163552 A1 Aug. 28, 2003

(51) Int. Cl.
*G06F 15/16* (2006.01)

(52) U.S. Cl. ........................................ 709/246; 709/219

(58) Field of Classification Search ................. 709/203, 709/219, 226, 229, 244–246
See application file for complete search history.

(56) References Cited

U.S. PATENT DOCUMENTS

| 5,790,790 | A | * | 8/1998 | Smith et al. ................. 709/206 |
| 5,802,518 | A | * | 9/1998 | Karaev et al. .................... 707/9 |
| 6,029,175 | A | * | 2/2000 | Chow et al. .............. 707/104.1 |
| 6,192,407 | B1 | * | 2/2001 | Smith et al. ................. 709/229 |
| 6,205,478 | B1 | * | 3/2001 | Sugano et al. .............. 709/223 |
| 6,205,481 | B1 | * | 3/2001 | Heddaya et al. ............. 709/226 |
| 6,446,093 | B2 | * | 9/2002 | Tabuchi ...................... 707/205 |
| 6,487,599 | B1 | * | 11/2002 | Smith et al. ................. 709/229 |
| 6,529,956 | B1 | * | 3/2003 | Smith et al. ................. 709/229 |
| 2002/0078052 | A1 | * | 6/2002 | Cheng ......................... 707/10 |
| 2002/0111911 | A1 | * | 8/2002 | Kennedy et al. .............. 705/51 |

FOREIGN PATENT DOCUMENTS

| JP | 2000242697 A | * | 9/2000 |
| JP | 2001-101114 A | | 4/2001 |
| JP | 2001-273279 A | | 10/2001 |
| JP | 2002-055869 A | | 2/2002 |

OTHER PUBLICATIONS

Not translated to English. Furthermore, an office action to an application is not qualified prior art.

* cited by examiner

*Primary Examiner*—William C. Vaughn, Jr.
*Assistant Examiner*—Yemane Mesfin
(74) *Attorney, Agent, or Firm*—Townsend & Townsend & Crew LLP (57) ABSTRACT

A document storage and distribution system includes distributing documents in accordance with a distribution list. Each copy of the distributed document is identified with an identifier that includes the information indicative of the computer system in which it was created. Modifications to the document can be uploaded to the system from any computer system to which the document had been distributed. The modified documents are then re-distributed from the computer system in which it was originally created.

26 Claims, 6 Drawing Sheets

DOCUMENT DISTRIBUTION AND STORAGE SYSTEM

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

In any organization of significant size, countless documents are generated during the normal course of running the organization. Document distribution and document retrieval need to be efficient operations so that information can reach their destination in a timely manner. This can become a non-trivial task if the organization is widely distributed over a large geographical area. When information is added, removed, or otherwise modified, the additional information must likewise be disseminated efficiently to ensure the information is current.

Various considerations must be taken into account. Limitations in physical storage generally preclude a solution which involves brute force large-scale duplication of documents throughout the organization. In the case of multimedia files which typically are very large, the bandwidth required to send copies of such files to all sites becomes prohibitive.

Another technique is a peer-to-peer architecture in which a file server at each site in an organization can access the other file servers. However, this approach restricts the use of security features such as firewalls.

Shared file systems are another commonly used architecture for sharing documents. However, the centralized nature of a shared file system exhibits degraded performance when loaded by many users. Shared file systems have limited security features which may not be acceptable in some situations.

BRIEF SUMMARY OF THE INVENTION

A document storage and distribution system and method in accordance with various embodiments of the present invention include providing each document with an identifier (such as a name) which includes information indicative of the server system on which it was created (the origin server). A distribution list identifies those servers to which the document is to be distributed. The document is identified at each destination by a local identifier which includes information indicative of the origin server. A notification list identifies users who should be notified of the document.

As will be discussed below in connection with a particular embodiment according to the invention, the naming convention for the identifier is based on the world wide web (WWW) universal resource locator (URL) naming scheme. The identifier comprises two parts: "http://hostname" which identifies the local server, and "/DRI/..." which is the remainder portion of the URL referred to as the "path" and is the same on every local server.

Modifications to a document are distributed in a similar manner. However, a document can be modified at any server to which the document had been distributed. The modified document is transferred to its corresponding origin server (possible by virtue of the fact that the local identifier includes information which identifies the origin server) and then distributed according to the distribution list. The distribution list and notification list can be modified as well. These lists remain associated with the document and with each new version of the document.

Each version of a document is maintained. The distribution and notification lists can be different from one version of the document to the next.

A resource is a term used herein to refer to a document or to a collection of documents. The document distribution and storage system manages a collection of resources. Thus, documents can be organized as individual unrelated documents and as collections of related documents. A modification to a "resource" to produce a new version of the resource can involve modification of a single document, or modifications of two or more documents in a collection of documents.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
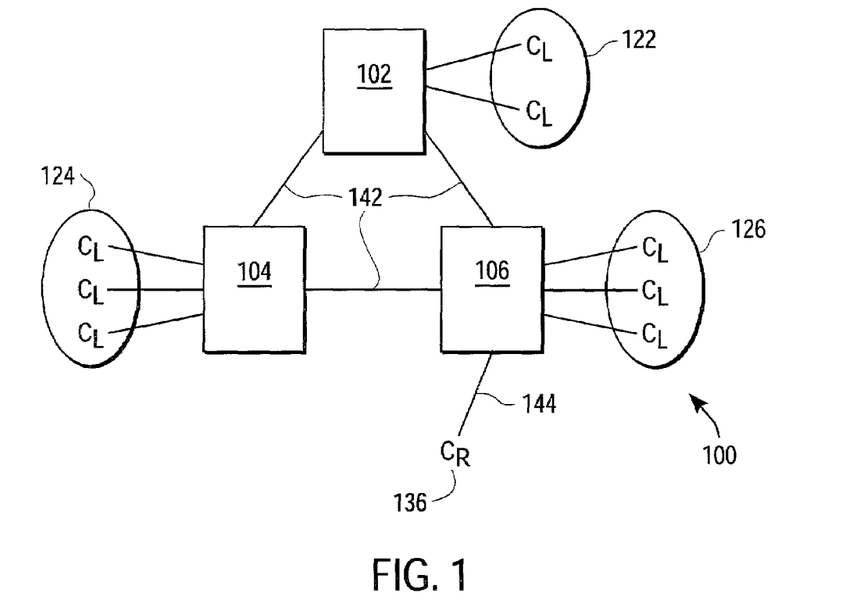
FIG. 1 shows a high level block diagram of a document management system according to an illustrative embodiment of the present invention.

FIG. 1 is a high level block diagram showing elements of a generalized basic architecture of a document management system 100 according to various embodiments of the invention. A "document" can be a collection of information including but not limited to text, audio information, visual information, combinations of such information, and so on. Thus, for example, a motion video document may comprise a file containing video and audio information. Alternatively, the collection of information may reside in one or more individual files. For example, a motion video document might comprise a video file and a separate audio file. In this case the 'document' is a logical entity comprising two or more files. The term "resource" will be used to refer to individual documents or a collection of documents. The specific meaning of the term "resource" can be determined from the context in which it is used. When a resource refers to a collection of documents, the term "collection resource" can be used. A plurality of resources are collectively stored in a distributed document store (DDS) in accordance with embodiments of the present invention.

The system 100 shown in FIG. 1 includes a plurality of computer systems 102, 104, 106. Each computer system is capable of providing a variety of computer services to its users. Thus, users 122 will request services from computer system 102. Similarly, users 124 will request services from computer system 104, and likewise users 126 will request services from computer system 106. A term commonly used to name computer systems 102, 104, and 106 is "server" since the computers provide services to its users. A term commonly used to name the users 122, 124, and 126 is "client." A client can be a human user accessing the server via appropriate client software. A client can be a machine executing appropriate client software to access the server to perform an automated task.

The clients ("users") 122, 124, 126 can access their respective servers via any of a number of known communication methods. For example, clients $C_L$ may connect to the server via a local area network (LAN), or via a wide area network (WAN). Clients $C_R$ may connect to the server via dial-up telephone connections. Clients may connect to the server using wireless technologies. These and other communication techniques are well within the scope of understanding of those of ordinary skill in the relevant arts. The specific communication medium employed between server and client will be driven by considerations not relevant to the practice of the invention, such as system cost, data throughput and so on.

FIG. 1 also shows the servers 102, 104, 106 to be in data communication with each other. As with the client-server communication links, any of numerous known communication techniques can be employed to provide data communication among the servers. As with the client-server communication links, the specific communication technique used for server to server communication will depend largely on considerations not relevant to the practice of the invention. However, link characteristics related to security, such as whether the link are bi-directional (e.g., both servers can initiate a connection) should be taken into consideration to provide secured access to documents in the system.

In accordance with a particular embodiment of the invention, the computer systems 102, 104, 106 are world wide web (WWW) servers. The world wide web is a common well-known server platform that is suited for the document management system of the present invention. The web communication protocol, hypertext transport protocol (HTTP) serves both as the communication protocol between server and client and as the basis for naming the document resources. Typically server to server communication is based on HTTP, but other protocols can be used.

Accordingly, client software is of the type commonly referred to as a "web browser." Conventionally available browsers can be used and appropriately written "plugin" modules can be provided as needed. Custom clients can also be written. It is understood, however, there is no requirement that the server be a web server. Custom server and client software and an appropriate communication protocol can be written to operate in accordance with the disclosed teachings of the invention.

The document management system in accordance with this particular embodiment of the invention is a distribution and storage system comprising a set of cooperating web servers that form the back end of a web-based multimedia messaging service. At the highest level, the document management system manages a set of related "messages" which are collectively referred to as a "distributed document store." The "messages" which comprise the distributed document store are represented by web resources: documents or collections of documents. As will be discussed in further detail below, resources are created and uploaded to one server and distributed to other servers in the system. Resources can be modified and distributed to the servers, as well. Users associated with the resource are notified.

Each resource (including copies of the resource) has associated with it, information indicative of its location in the document distribution and storage system. Each resource is further associated with a unique identifier which includes information indicative of the server of its origin, referred to hereafter as the "origin server." In accordance with this particular embodiment of the invention, a resource is treated as a web page, and like any web page, each resource is associated with a universal resource locator (URL). In accordance with this particular embodiment of the invention, the path portion of the URL constitutes the unique identifier, referred to hereafter as a "distributed resource identifier" (DRI). Purely by convention, the following general naming format is used for the DRI:

.../-DDS-/ORIGIN/..., where DDS is the name of a particular collection of resources, and ORIGIN is the fully-qualified hostname of the origin server for the resource identified by the DRI.

Thus, for example, suppose a resource has the following URL:

http://machine1.com/-msg-/machine2.com/2001/jones/0/the-document

This resource belongs to a collection of resources named "-msg-." The host machine containing this particular copy of the resource is named "machine1." The original copy of the resource (i.e., its place of creation) is located in a machine named "machine2." In this example, the resource is a single document named "the-document." In this particular embodiment of the invention, the resources are contained in directories, though other data storage conventions can be used; e.g., the resources can be stored in a database.

Both the host machine ("machine1") and the origin machine ("machine2") have the following directory structure and URL naming structure. Each machine has a directory called "-msg-" contained in their respective server's "document root" directory. On each machine, the "-msg-" directory has a sub-directory called "machine2.com" which contains all the messages originating on "machine2.com." Incidentally, the "-msg-" directory in each machine might also contain a sub-directory called "machine1.com" for messages originating on "machine1.com."

In the case where the resource is a collection of documents, the terminal component of the URL would be a directory name. Thus, the following URL identifies a resource that comprises a collection of documents, naming only the directory in which the collection of documents can be found, namely "/msg/2001/jones/0/":

http://machine1.com/-msg-/machine2.com/2001/jones/0/

Figure 2:
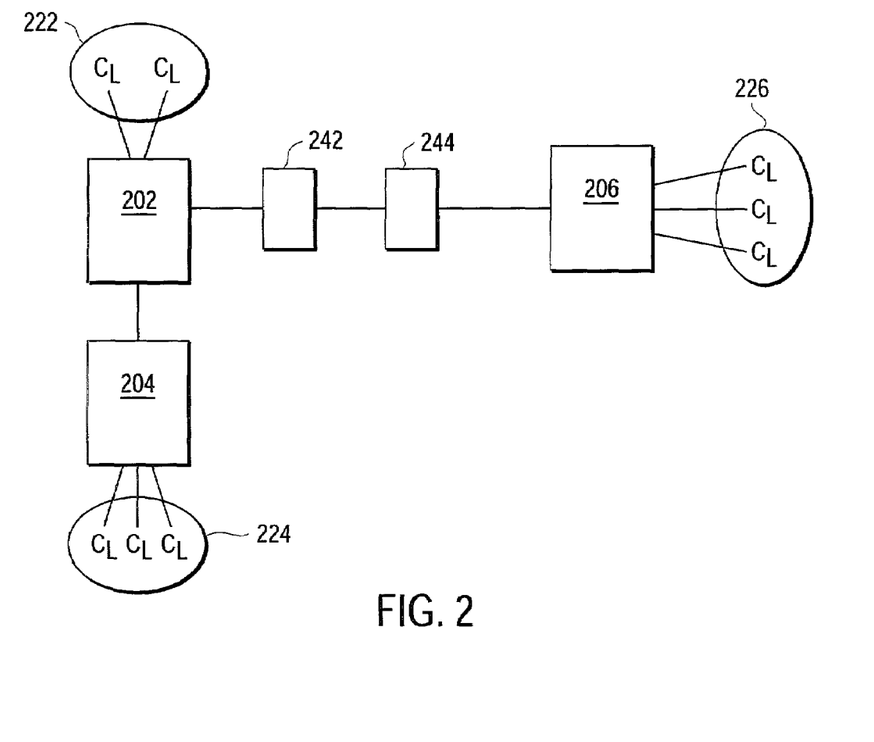
FIG. 2 shows a high level block diagram of a document management system in accordance with a second illustrative embodiment of the present invention.

FIG. 2 shows a general system architecture of another embodiment of the present invention. In this particular embodiment, an origin server (e.g., server 202) and a destination server (e.g., server 206) are not mutually accessible. However, one or more intermediate servers 242, 244 exist which allow the origin and destination servers to exchange information by relaying the information via the intermediate servers.

Figure 3:
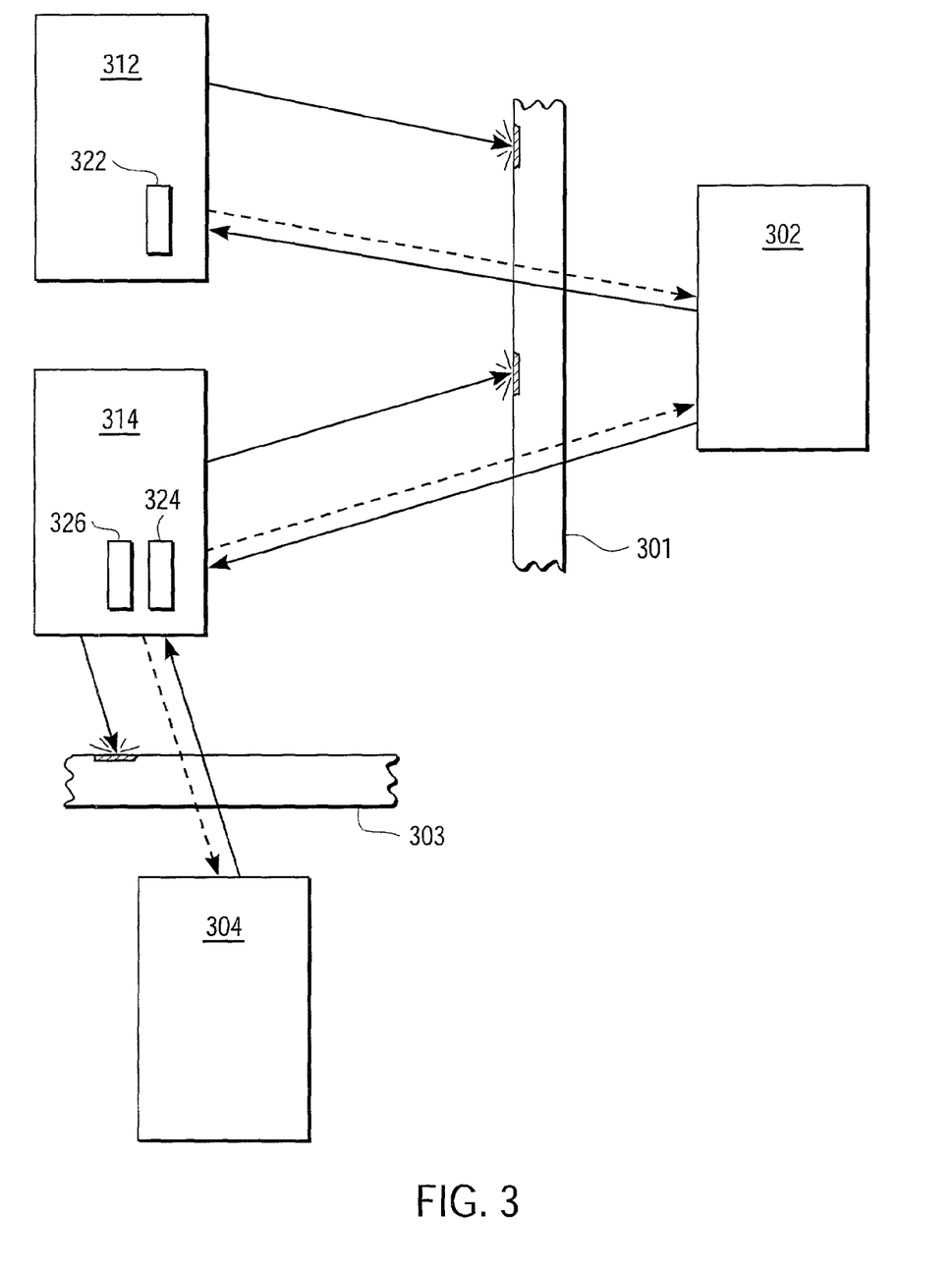
FIG. 3 is a high level block diagram of yet another illustrative embodiment of the present invention.

FIG. 3 shows a generalized system architecture of yet another embodiment of the invention wherein a destination server 302 is protected by a firewall mechanism 301. Typically, a firewall allows the destination server to access other servers but does not allow incoming requests from outside servers 312, 314 (including an origin server) to access the destination server. Each of the other servers 312, 314 has a queuing-type mechanism 322, 324, respectively, set up in each machine that is associated with the destination server 302. The destination server 302 periodically checks its associated queue in each machine for requests. As will be explained below, this queuing mechanism is used to distribute resources to servers that have firewalls. FIG. 3 also shows another server 304 having a firewall 303. Server 314 has a second queue 326 that corresponds to server 304, which is polled by server 304. Server 314 illustrates that a server can have multiple queues for multiple servers.

Figure 4:
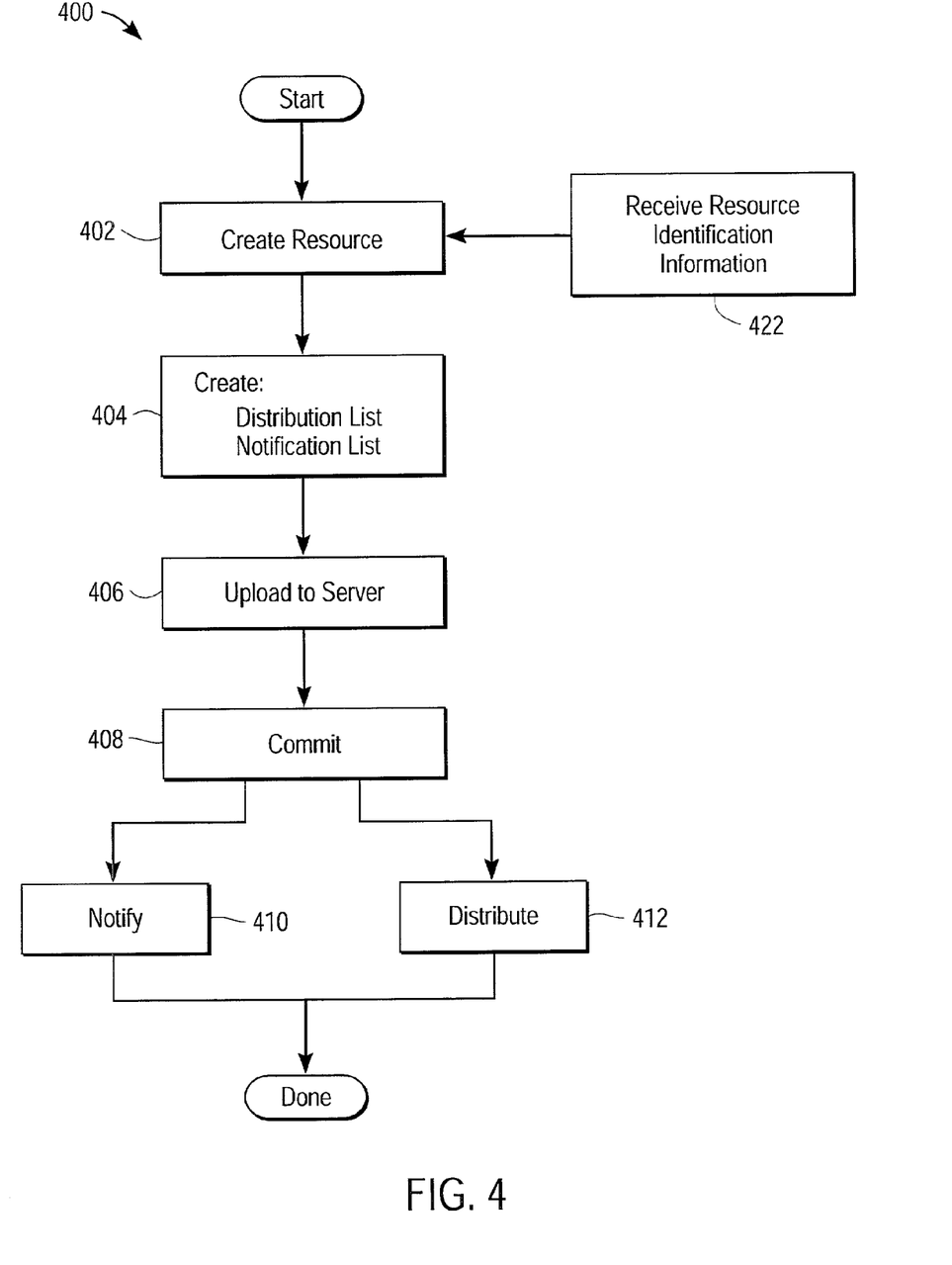
FIG. 4 is a general flowchart showing how a resource is created and distributed in accordance with embodiments of the invention.

Refer now to FIG. 4 for a discussion of the process of creating a resource according to the particular embodiments of the invention. The high level flow chart 400 illustrates the basic steps of creating and subsequently distributing the newly created resources. Generally, the following steps occur:

client connects to origin server to start the process client requests the server to create a new resource (step 402)

client uploads documents into the resource (steps 404, 406) including distribution lists of servers and/or users client requests the server to commit and start distribution (step 408)

origin server maps users (recipients) to servers they can access and adds those servers to the distribution list each server notifies its local users via e-mail specifying local server's URL (step 410)

origin server distributes the resource to each other server on the list (step 412)

Thus in step 402, a client (human or machine) requests a service for creating a new resource. The resource can be a single document, or a collection of documents. The server provides (step 422) predetermined information which identifies the resource to facilitate the subsequent uploading of the resource to the server. The information can be a list of resource identifiers. The identifiers can be created in any of known ways. For example, one may use random number generation techniques or even an algorithm for creating identifiers. This avoids duplication of resource identifiers among concurrent multiple clients who may be creating resources either online or offline, and it facilitates security by producing difficult to guess names. In accordance with the particular embodiments of the invention, a DRI is supplied to identify the resource.

In addition to creating the resource, a corresponding "distribution list" and a corresponding "notification list" are associated with the created resource, step 404. The distribution list and notification list can be created from scratch, or taken from existing lists and modified as needed. The lists can also be automatically compiled. The distribution list identifies those servers to which copies of the created resource will be transferred. The notification list identifies the users (human or machine) who will be notified of the creation of the resource.

During the process of creating the resource, initial copies of the resource and distribution and notification lists might be uploaded to the server, step 406. Subsequent edits might be made and uploaded to the server. This sequence can be repeated a number of times until the resource creation process is deemed complete. At that time the resource is "committed" by the client by sending a COMMIT request to the server, step 408. In practice, the notification and distribution lists are treated as part of the collection along with the resource. Thus, the created resource and notification and distribution lists are committed at once.

A copy of the newly created resource is distributed to each server identified in the distribution list, step 412. This may include the server modifying the distribution list before performing the distribution.

Users in the notification list are notified of the newly created resource, step 410. Notification can be accomplished in various ways. For example, email is a common tool for communicating among users in a networked environment and is suitable for notifying users. A messaging technology known as "instant messaging" can be used to inform recipients. Conventional technology such as pagers can be used. Notification can be accomplished by faxing services, internet faxes, courier services, and so on. In some configurations, a server may be configured in an intranet environment and is thus isolated from the global Internet. Consequently, only those clients local to the intranet can access such a server. In such a situation, the server will provide notification to its own local clients who are in the notification list.

In accordance with the particular embodiments of the invention, the following are performed when a resource is committed (steps 408-412) to the local server. The basic steps of commit processing include: (1) initial processing in the local server; (2) preparation for distribution; (3) distribution list and notification list processing; and (4) file transfer.

Recall that the particular embodiments of the invention are based on a system of web servers. Web servers typically use a programming standard known as the common gateway interface (CGI). Gateway programs, or CGI scripts, are executable programs that can be run by themselves. Some of the more well known and commonly used languages for writing CGI scripts include: C, C++, Perl, Python, TCL and shells. The CGI standard is used because CGI scripts can run interchangeably under various information servers, but is otherwise not necessary to the invention. Following is a brief discussion of the CGI scripts which provide the actions that take place when a resource is committed, the specific implementation details being well within the scope of understanding of persons of ordinary skill in the relevant programming arts for web servers.

After the resource is created and uploaded to the server, the "initial processing" step that takes place in the server is performed by a CGI script called "commit." The functions provided by this script include the following:

(1) If the resource being committed is an upload session for a new layer AND the local server is also the origin server for the resource, a new layer number is assigned. A discussion of the notion of a "layer" and "layer number" will be presented below.

Typically, the server to which the resource is uploaded is the origin server. However, in the case that the local server is not the origin server, the resource is first transferred to the origin server.

(2) Update and verify a metadata file associated with the resource. The metadata file contains information related to the resource to facilitate the management of the resource. A metadata file might include such information as the list of files in a collection. File type information such as mime types can be included; e.g., image/jpeg, audio/wav, and so on. Height and width information of images can be stored in a metadata file. Metadata for audio files may include length of time information. The metadata file can include checksum information to verify correct uploads to the server. As can be seen the metadata file can be used to store various kinds of supporting information.

(3) Enqueue a PREP request to the local server. The PREP request initiates the "preparation for distribution" step. Instead of enqueuing a PREP request, the commit CGI can initiate the "preparation and distribution" step by transferring control to the "prepare" CGI script (see below). For example, in a UNIX-like environment, the commit CGI can fork off a process and pass control to the new process. Other well known and understood mechanisms can be used.

The "preparation for distribution" activity is performed by a CGI script called "prepare." This CGI script is executed in response to the PREP request or as a process spawned by the commit script in the same manner as discussed above. The prepare CGI script computes the distribution list and prepares information for notifying users to be informed of the new resource. The operations performed include:

(1) Identify the users local to the server, from the notification list. Identify the servers to which copies of the resource will be distributed, from the distribution list.

(2) Compute (or update) a distribution/notification file from the distribution list and the notification list. This file contains the list of servers to which copies of the resource will be distributed. The file also contains a list of non-local users who cannot access the local server, but who might be able to access one or more of the servers in the distribution file.

(3) (optional) Construct auxiliary files, including templates for notification messages, scaled images, HTML (hypertext markup language) image maps, and so on. For example, the notification can be a thumbnail image transmitted as an attachment in an email. In general, auxiliary files can be any useful automatically generated files which facilitate the notification function.

(4) Perform non-standard localized notification, e.g., instant messaging, voice mail notification, facsimile transmission, and so on. This is to accommodate some local users who request, or otherwise require, specialized notification procedures.

(5) If the distribution/notification file is not empty, then enqueue a DIST request on the local server. The DIST request will start another process to initiate resource transfer processing. Depending on implementation, the prepare CGI can simply transfer control by spawning a process to perform "distribution list processing" in the manner discussed above.

The origin server computes a list with all the servers it knows about, and distributes to those servers. Each subsequent server distributes only to servers it knows about that are not on the initial list. In this way, the distribution eventually process stops.

The "distribution list processing" function is performed by a CGI script called "distribute." This script is executed in response to receiving the DIST request or as a result of being forked off as a separate process by the prepare CGI script. The distribute CGI script runs through the distribution/notification list and notifies its local users by sending an email, or by other locally-defined methods.

The distribute CGI script also enqueues requests for transferring the newly created resource to the servers listed in the distribution/notification list. In general, there are two techniques to transfer a resource or collection: (1) using a sequence of HTTP POST or PUT requests to "push" the data; or (2) using a sequence of HTTP GET requests to "pull" the data.

In the architecture shown in FIG. 1, where the local server and the destination server are mutually accessible, it doesn't matter which technique is used. In accordance with the particular embodiments of the invention, the distribute CGI will enqueue a SEND request on the local server to indicate that a resource is queued up for transfer to a destination server. A separate process will interpret the enqued SEND as a request to "push" the resource to the destination server, and initiate a sequence of operations to send a copy of the resource to the destination server. Alternatively, a TAKE request can be enqueued for the destination server. A suitable process on the destination server then initiates a sequence of operation to "pull" the resource from the local server, thus obtaining a copy of the resource on the destination server.

In the case where the destination server (e.g., server 304) has a firewall as shown in FIG. 3, the source server (e.g., server 314) indicates to the destination server 304 that the former has a resource that needs to be pulled into the latter. This can be achieved, for example, by sending an email to the destination server.

Alternatively, the destination server 304 can periodically poll a queue on the source server 314. Typically, a firewall security mechanism does not prevent a protected system (the server in this case) from issuing requests to a server (the source in this case) outside it protected network. In the particular embodiment shown in FIG. 3, the source server 314 contains a queue 326 that corresponds to the destination server 304. The source server enqueues a TAKE request in that queue. The destination server periodically polls the source server for its corresponding queue. When the destination server detects a TAKE request in the queue, appropriate actions can be taken to directly access the resource from the source server. The SEND and TAKE requests have additional associated information sufficiently identifying the resource to be transferred.

The "file transfer" processing is performed by a CGI script called "transfer." A locally executing copy of this script on the source server 314 will be triggered by virtue of the SEND request being enqueued in its queue 326. In response to this event, the transfer script will transfer a copy of the resource to each destination server for which there is an associated SEND request pending.

In the case of FIG. 3, where a destination server cannot be accessed by the local server (because of a firewall or other similar mechanism), there is a queue on the local server which is periodically polled by that destination server. When the destination server detects a TAKE request in its queue, it receives a copy of the resource by "pulling" a copy from the local server in which the TAKE request was detected.

In addition to receiving the resource, the destination server also receives the destination/notification file. A COMMIT action is then requested in each of the destination servers and commit processing is repeated in each of the destination servers. The processing continues in this recursive manner, propagating through the servers in the distribution list until all of the servers receive a copy of the resource and all of the users in the notification list have been notified.

Refer back to FIG. 2 for a moment. The configuration shown in FIG. 2 shows one or more intermediate servers 242, 244 bridging a server 202 and a server 206. As discussed above, this configuration depicts a situation in which a server (say, server 202) has a resource that should be copied to another server (say, server 206), but neither server can access the other. In this case, the distribution list would contain information about the intermediate servers thus allowing the resources to propagate through the intermediate servers to reach the destination server.

Alternatively, a search can be performed, where the requesting server queries each of its known neighbors in turn. This operation is similar to well-known internet route discovery protocols. Still yet another search alternative is to sent an email request to an automated process on the unknown server, requesting the name of an intermediary server. In practice, such searches will rarely be necessary, because the routing information propagates along with the messages in a manner similar to the path information used in NNTP ("news") messages.

Figure 5:
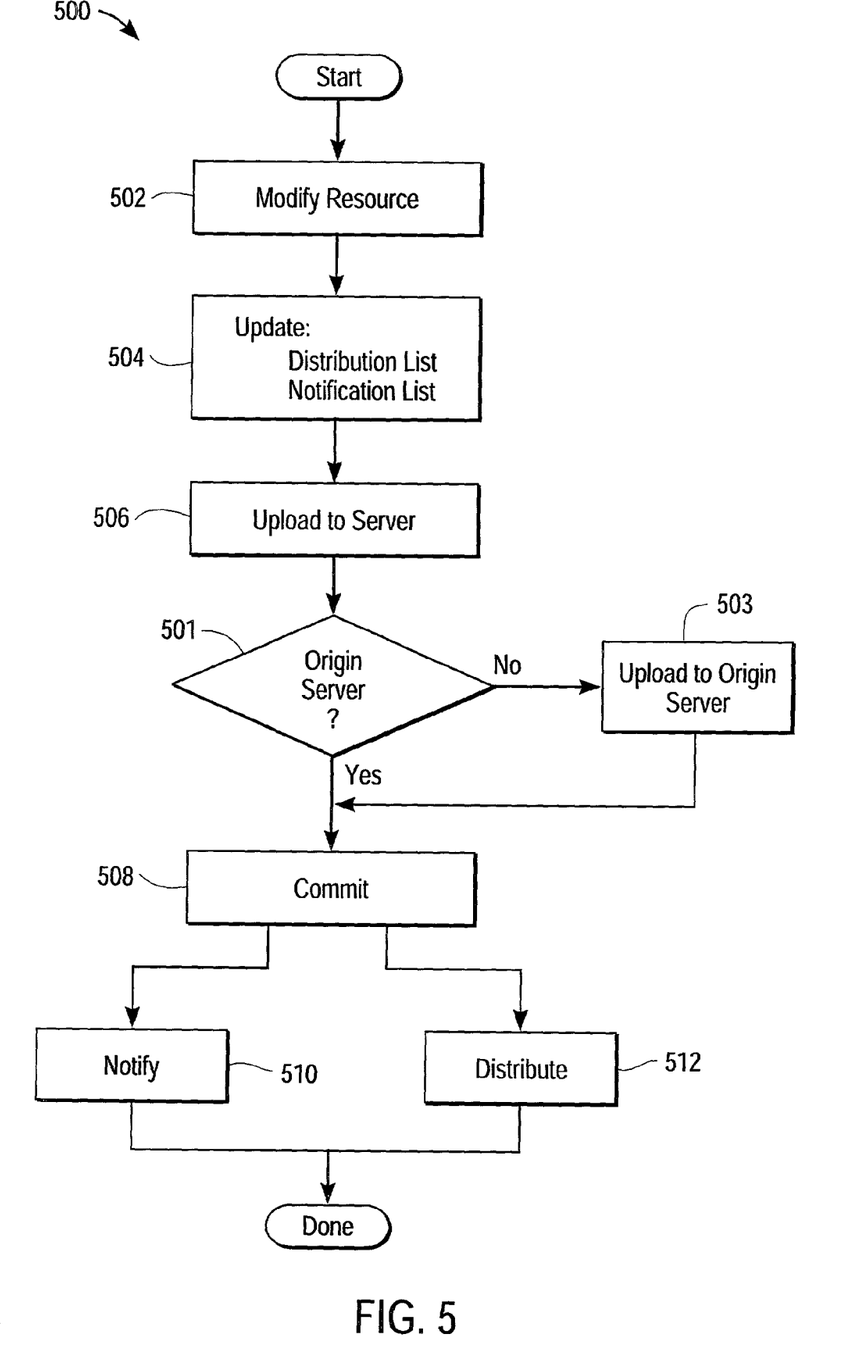
FIG. 5 is a general flowchart showing how modifications to a resource are distributed in accordance with embodiments of the invention.

FIG. 5 shows another aspect of the invention, which is the distribution and notification of modifications made to a resource, namely, a collection of documents. When a user (whether a human user or a machine user) modifies a resource, the modified resource is uploaded to the server (into a new session collection) and subsequently distributed.

FIG. 5 shows the general processing. A user client accesses its server to make a request to modify a resource (which may include the distribution list and the notification list), step 502. This includes specifying the DRI portion of the URL which identifies the resource. In response, the server provides a session ID to identify the new resource.

After the desired edits are made to the resource and possibly to the distribution list and the notification list, the client uploads the modified resource along with the session ID to the server, step 506. If it is determined that the server is not the origin server for the resource (step 501), then the server uploads the resource to the origin server, step 503. Recall the DRI contains the machine name of the origin server, and so the origin server can be accessed for uploading by referring to the DRI portion of the URL associated with the resource.

In the case of an architecture such as shown in FIG. 2 where the server containing the modified resource (say for example, server 206) and the origin server (say for example, server 202) are mutually inaccessible, the modified resource can be propagated back to the origin server via the intermediate servers. Information about the chain of intermediate servers back to the origin server is contained in the distribution list.

When the origin server receives the modified resource, some form of version control processing can be performed. Following are some basic ways to handle version control of a modified resource:

(1) Not at all: just upload the resource on top of the existing resource.
(2) Threads: Create a new resource directory that only contains the new file or files which comprise the modified resource. Old files are referenced by their DRI's.
(3) Traditional version control (VC) tools: Whenever a resource is uploaded, check the constituent file or files in to a traditional version control system like RCS or CVS. (Presumably the VC files are located only on the origin server.)
(4) Layers: The resource is always in the same directory or layer (meaning it keeps its URL), but when a set of changes are committed the new file or files which comprise the modified resource are moved into a new directory with a new layer number, representing the next state of the resource. Symbolic links or some similar aliasing mechanism can be used to avoid unnecessary duplication of files. This idea of layers and layer numbers will be discussed in more detail below.

Continuing with FIG. 5, the origin server now contains the modified resource. Next, the origin server initiates commit processing, steps 508-510 to distribute the modified resource. At this point, the commit processing for the modified resource proceeds in the same way as for a newly created resource as discussed in connection with steps 408-410 in FIG. 4. The modified resource is distributed to the servers specified in the distribution list and the users listed in the notification list are notified.

Figure 6A:
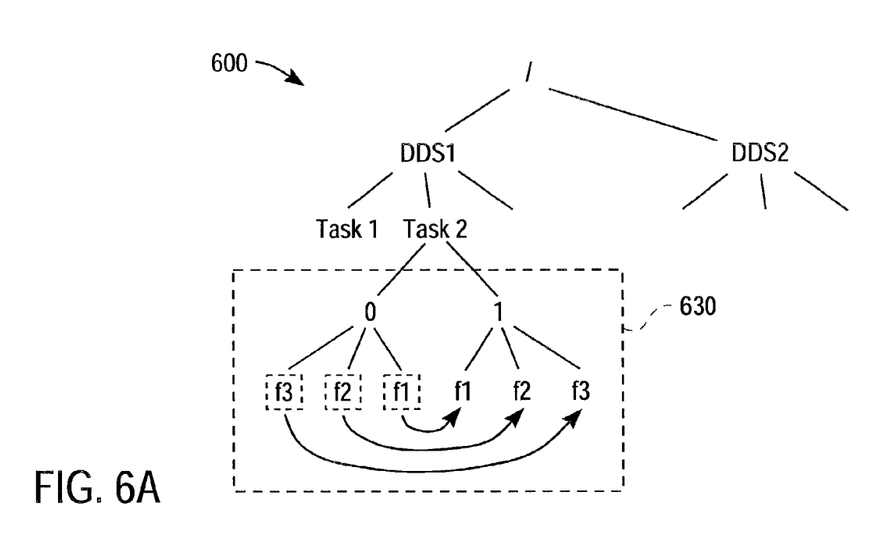
FIGS. 6A-6C show a partial file system illustrating the process of layer numbering for version control.
Figure 6B:
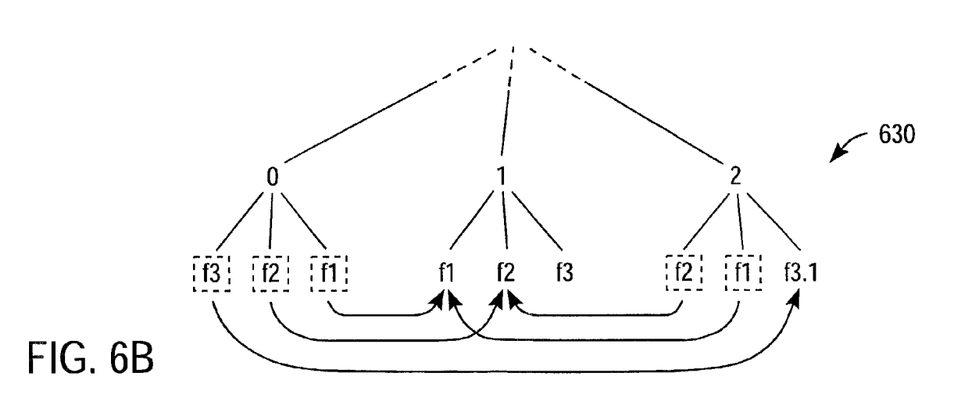
Figure 6C:
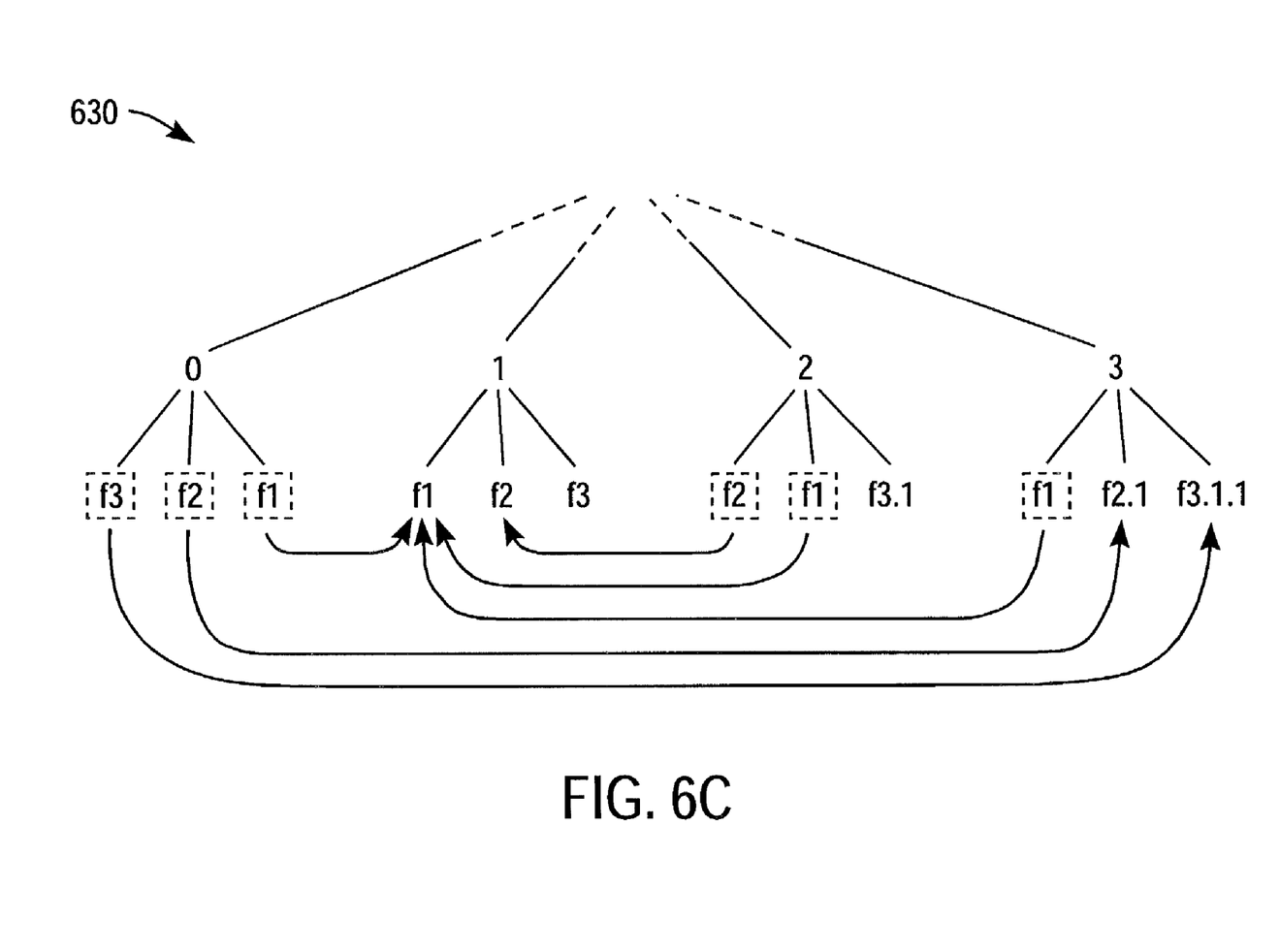

With reference to FIGS. 6A-6C, a discussion of the notion of "layers" for version control according to the particular embodiments of the invention will be presented. By convention, a collection resource (which is a resource comprising a plurality of documents) is identified by a URL that ends with ". . . /rsrc-name/x/," where "rsrc-name" is the name of this particular resource and x is an integer. More specifically, a collection resource is a directory the pathname of which includes the name of the resource and ends with ". . . /x/." The resource is referred to as being in "layer x". Also by convention, the "top layer" of the resource is layer 0. The top layer represents the most current version of the resource. Modifications to one or more resources in the collection resource are contained in subsequent layers, so that a version history can be maintained. Layer 0, the top layer, will always point to the most recent version of the collection resource.

Referring to FIG. 6A, a partial file system is shown. The directory DDS1 represents a collection of resources. The resource named "task2" comprises the document resources named f1, f2, and f3. For discussion purposes, suppose the file system is located on a machine having a hostname of "machine1." The DRI for the "top layer" (i.e., layer 0) of the resource "task2" is:

. . . /-DDS1-/machine1.com/task2/0/

In accordance with the particular embodiments of the invention, the filenames for the document resources f1, f2, and f3 are symbolic links to the actual documents, indicated by the dashed boxes. When the documents for a collection resource are initially created and uploaded to the origin server, they are placed in the layer 1 directory of the origin server. FIG. 6A shows files f1, f2, and f3 located in the . . . /1/ directory. Next, a symbolic link to each file in the layer 1 directory is created in the layer 0 directory. Alternatively, symbolic links can be created from the . . . /0/ directory itself to the . . . /1/ directory. At this point, the "top layer" comprises the documents in the layer 1 directory.

FIG. 6B shows a portion 630 of the file system identified by the dashed box in FIG. 6A. FIG. 6B shows an example in which one or more resources in the collection resource named task 2 have been modified. In the example, document f3 has been modified and named f3.1. First, it can be seen that a new layer is created to contain a new version of the task2 collection resource, namely layer 2, having a pathname of:

. . . /-DDS1-/machine1.com/task2/2/

The layer 2 directory contains the modified document f3.1. However, as to the unmodified documents, f1 and f2, symbolic links are created in the layer 2 directory to point to the actual files in the layer 1 directory. Layer 2 now represents the most recent version of the "task2" collection resource. The symbolic links in the top layer are updated accordingly. As can be seen in the layer 0 directory, the link to the file f3 is now updated to point to the file f3.1 in the layer 2 directory instead of file f3 in the layer 1 directory. The other links remain pointed to the unmodified files (f1, f2) in the layer 1 directory. In this way, layer 0 represents the most recent version of the collection resource "task2", and layer 1 represents the first version of the collection resource.

FIG. 6C shows yet another modification to the collection resource "task2"; this time document f2 and document f3.1 being modified. Layer 3 is created and contains modified documents f2.1 and f3.1.1. Since document f1 has not been modified since its creation, a symbolic link to f1 in layer 1 is created in layer 3. Links in layer 0 (the top layer) are updated accordingly; i.e. document f2 now points to document f2.1 in the layer 3 directory and document f3 points to document f3.1.1 in the layer 3 directory. Document f1 in the layer 0 directory still points to f1 in the layer 1 directory. Successive modifications to the collection resource can thus be tracked in this way, while still allowing access to earlier versions of the collection resource.

In order to maintain an uninterrupted chronological sequence of layers, it is necessary that layers be created only on the origin server. If some other server is used to modify a resource, the other server will create a "session" collection to contain the updates. By convention, a session is represented by a URL that ends with ". . . /rsr.name/server_name.X" where 'X' is an integer unique to the server that created the session. When a "commit" operation is performed on a session, it is transferred to the origin server where it is converted to the new layer, which is then committed and distributed as described above.

What is claimed is:

1. A method for distributing documents, comprising:
producing a first identifier adapted for association with a first document, the first identifier including first information indicative of a first server configured to create the first document in an original document format;
transmitting the first identifier from the first server to a client based upon at least a request from the client to create the first document on the first server in the original document format;
associating the first identifier by the client with the first document;
transmitting a copy of the first document in the original document format from the client to the first server;
receiving a distribution list associated with the first document, the distribution list identifying a second server;
transmitting a commit request to the first server;
in response to the commit request, transmitting a copy of the first document from the first server to the second server identified by the distribution list, the first server and the second server thereafter responsive to one or more download requests for one or more copies of the first document, the download requests containing the first information;
in response to receiving a second document representative of a modified version of the first document, determining the server that created the first document in the original document format based on the first information; and
propagating a copy of the second document to the server that created the first document in the original document format based on the distribution list.

2. The method of claim 1 wherein receiving the distribution list associated with the first document comprises receiving the distribution list identifying one or more other servers different from the first server.

3. The method of claim 1 further including receiving a notification list associated with the first document, the notification list identifying one or more users.

4. The method of claim 1 wherein transmitting the copy of the first document from the first server to the second server identified by the distribution list further includes receiving a download request from the second server, and in response thereto initiating a sequence of operations between the first server and the second server so that the first document is transferred from the first server to the second server, the download request including the first information.

5. The method of claim 1 wherein delivering the copy of the first document from the first server to the second server identified by the distribution list includes transferring the first document to at least one intermediate server to produce an intermediate copy of the first document in the original document format, and transferring the intermediate copy from the at least one intermediate server to the second server.

6. The method of claim 1 wherein delivering the copy of the first document from the first server to the second server identified by the distribution list comprises:
informing the second server of a distribution request; and
in response to the distribution request, the second server initiating a sequence of operations with the first server to transfer the first document to the second server.

7. The method of claim 1 wherein delivering the copy of the first document from the first server to the second server identified by the distribution list comprises:
storing second information to a first memory location in the first server;
the second server accessing the first memory location to detect for a presence of the second information; and
the second server initiating a sequence of operations with the first sewer wherein the first document is transferred to the second server in response to detecting the presence of the second information.

8. The method of claim 1 further including receiving at the first server the second document from the second server, the first server storing the second document while retaining the first document, the first server distributing the second document to one or more other servers based on the distribution list.

9. A method for distributing documents, comprising: producing a first identifier adapted for association with a first document, the first identifier including first information indicative of a first server configured to create the first document in an original document format;
transmitting the first identifier from the first server to a client based upon at least a request from the client to create the first document on the first server;
associating the first identifier with the first document;
transmitting a copy of the first document to the first server from the client, the first document in the original document format;
receiving a distribution list associated with the first document, the distribution list identifying a second server different from the first server;
transmitting a commit request to the first server;
in response to the commit request, the first server distributing a copy of the first document to the second server identified by the distribution list;
making one or more copies of the first document available for download from the first server and from the second server using at least the first information;
in response to receiving a second document representative of a modified version of the first document, determining the server that created the first document in the original document format based on the first information; and
propagating a copy of the second document to the server that created the first document in the original document format based on the distribution list.

10. The method of claim 9 wherein the first server distributing the copy of the first document to the second server identified by the distribution list includes transferring the first document to at least one intermediate server to produce an intermediate copy in the original document format, and transferring the intermediate copy from the at least one intermediate server to the second server.

11. The method of claim 9 wherein the first server distributing the copy of the first document to the second server identified by the distribution list comprises:
informing the second server of a distribution request; and in response to the distribution request, the second server initiating a sequence of operations with the first server to transfer the first document to the second server.

12. The method of claim 9 wherein the first server distributing the copy of the first document to the second server identified by the distribution list comprises:
   storing a transfer request to a first memory location in the first server;
   the second server accessing the first memory location to detect for a presence of the transfer request; and
   the second server initiating a sequence of operations with the first server wherein the first document is transferred to the second server in response to detecting the presence of the transfer request.

13. The method of claim 9 wherein the first identifier includes a naming component that is randomly generated.

14. A method for distributing documents, comprising:
   receiving a first document at an originating server based upon at least a request from a client to create the first document in an original document format on the originating server, the first document having associated therewith a first identifier comprising first information indicative of the originating server;
   receiving a first distribution list associated with the first document, the first distribution list identifying a first plurality of servers;
   distributing the first document from the originating server to the first plurality of servers identified by the first distribution list;
   at each of the first plurality of servers, associating a second identifier with the first document, the second identifier including the first information;
   in response to receiving a second document at at least one of the first plurality of servers, the second document being a second version of the first document, determining that the at least one of the first plurality of servers is not the originating server that created the first document in the original document format based on the first identifier;
   retaining the first document and the second document on the at least one of the first plurality of servers; and
   distributing the second document to a second plurality of servers, the second plurality of servers including at least the originating server.

15. The method of claim 14 wherein the first plurality of servers is the same as the second plurality of servers.

16. The method of claim 14 wherein the first plurality of servers is different from the second plurality of servers.

17. The method of claim 14 wherein the second document is associated with a second distribution list identifying the second plurality of servers.

18. The method of claim 14 wherein the first identifier is associated with the second document, whereby the second document is accessed by the first identifier.

19. The method of claim 14 wherein distributing the first document from the originating server to the first plurality of servers identified by the first distribution list includes the originating server initiating a sequence of operations with a second server to transfer a copy of the first document from the originating server to the second server.

20. The method of claim 14 wherein distributing the first document from the originating server to the first plurality of servers identified by the first distribution list includes transferring a copy of the first document to at least one intermediate computer system to produce an intermediate copy in the original document format, and transferring the intermediate copy from the at least one intermediate computer system to a second server.

21. The method of claim 14 wherein distributing the first document from the originating server to the first plurality of servers identified by the first distribution list includes informing a second server of a transfer request, and in response thereto the second server initiating a sequence of operations with the originating server to transfer the first document to the second server.

22. A computer program product for document storage and distribution comprising:
   one or more computer readable storage media having contained thereon computer program code suitable for being executed on a first server computer,
   the first server computer having associated therewith first identification information suitable to allow other computers to access the first server computer using the first identification information,
   the computer program code comprising:
      first executable code effective for operating the first server computer to receive a first document as an original document in an original document format from a client computer based upon at least a request from the client computer to create the first document on the first server;
      second executable code effective for operating the first server computer to associate a first identifier with the first document in response to receiving a commit request from the client computer, the first identifier including the first identification information indicative of the first server as the origin server;
      third executable code effective for operating the first server computer to receive a distribution list identifying a second server computer different than the first server computer; and
      fourth executable code effective for operating the first server computer to transmit the first document from the first server computer to the second server computer identified by the distribution list;
      fifth executable code effective for operating the first server computer to respond to one or more download requests comprising the first information for downloading one or more copies of the first document in the original document format;
      sixth executable code effective for, in response to receiving a second document representative of a modified version of the first document, determining the server that created the first document in the original document format based on the first information; and
      seventh executable code effective for propagating a copy of the second document to the server that created the first document in the original document format based on the distribution list.

23. The computer program product of claim 22 further comprising:
   eighth executable code effective for operating the first server computer to receive a second document from the second server computer, the second document being an original document in the second server computer; and
   ninth executable code effective for operating the first server computer to assign a third identifier to the second document, the third identifier including second identification information, the second identification information suitable to allow other server computers to access the second server computer using the second identification information.

24. The computer program product of claim 22 further including eighth executable code effective for operating the first server computer to initiate a sequence of operations with the second server computer so that the first document is transferred from the first server computer to the second server computer.

25. The computer program product of claim 22 further including eighth executable code effective for operating the first server computer to signal the second server computer of a transfer request and to interact with a sequence of operations initiated by the second server computer to transfer the first document to the second server computer.

26. The computer program product of claim 22 further including eighth executable code effective for operating the first server computer to store in a first memory location second information indicative of a transfer request, wherein the second server computer accesses the first memory location to detect for a presence of the second information, the second server computer initiating a sequence of operations with the first server computer wherein the first document is transferred to the second computer in response to detecting the presence of the second information.

* * * * *

UNITED STATES PATENT AND TRADEMARK OFFICE
CERTIFICATE OF CORRECTION

PATENT NO. : 7,451,236 B2
APPLICATION NO. : 10/085569
DATED : November 11, 2008
INVENTOR(S) : Stephen Savitzky et al.

It is certified that error appears in the above-identified patent and that said Letters Patent is hereby corrected as shown below:

<u>In the Claims:</u>

Claim 7, Column 12, Line 19, please delete "sewer" and insert --server--.

Claim 26, Column 16, Line 9, please insert --server-- before "computer".

Signed and Sealed this

Tenth Day of March, 2009

JOHN DOLL
*Acting Director of the United States Patent and Trademark Office*